(12) United States Patent
Shaffer

(10) Patent No.: US 6,839,416 B1
(45) Date of Patent: Jan. 4, 2005

(54) APPARATUS AND METHOD FOR CONTROLLING AN AUDIO CONFERENCE

(75) Inventor: Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 695 days.

(21) Appl. No.: 09/643,315

(22) Filed: Aug. 21, 2000

(51) Int. Cl.[7] .............................................. H04M 3/42
(52) U.S. Cl. ................................ 379/202.01; 709/204
(58) Field of Search ........................ 379/88.16, 101.01, 379/202.01–207.01, 259–265, 351–356; 709/204; 345/733

(56) References Cited

U.S. PATENT DOCUMENTS

| | | | | |
|---|---|---|---|---|
| 4,256,926 A | * | 3/1981 | Pitroda et al. ............... | 379/269 |
| 5,495,522 A | | 2/1996 | Allen et al. | |
| 5,548,638 A | * | 8/1996 | Yamaguchi et al. ... | 379/202.01 |
| 5,561,737 A | * | 10/1996 | Bowen ........................ | 704/275 |
| 5,724,416 A | * | 3/1998 | Foladare et al. ....... | 379/202.01 |
| 5,793,415 A | * | 8/1998 | Gregory, III et al. ...... | 348/14.1 |
| 5,825,858 A | * | 10/1998 | Shaffer et al. .............. | 379/120 |
| 5,916,302 A | * | 6/1999 | Dunn et al. .................. | 709/204 |
| 5,991,277 A | * | 11/1999 | Maeng et al. ................ | 370/263 |
| 5,995,827 A | * | 11/1999 | Gitlin et al. ................. | 455/416 |
| 6,148,068 A | * | 11/2000 | Lowery et al. ........ | 379/202.01 |
| 6,178,237 B1 | | 1/2001 | Horn | |
| 6,243,454 B1 | * | 6/2001 | Eslambolchi .......... | 379/202.01 |
| 6,349,136 B1 | * | 2/2002 | Light et al. ............ | 379/202.01 |
| 6,453,022 B1 | * | 9/2002 | Weinman, Jr. ........... | 379/88.13 |
| 6,490,556 B1 | * | 12/2002 | Graumann et al. ......... | 704/233 |
| 6,501,739 B1 | | 12/2002 | Cohen | |
| 6,535,730 B1 | * | 3/2003 | Chow et al. ................ | 455/416 |
| 6,556,670 B1 | * | 4/2003 | Horn ..................... | 379/202.01 |
| 6,563,916 B1 | | 5/2003 | Deutsch et al. | |
| 6,597,667 B1 | * | 7/2003 | Cerna ......................... | 370/260 |
| 6,614,781 B1 | | 9/2003 | Elliott et al. | |
| 6,615,170 B1 | | 9/2003 | Liu et al. | |
| 6,628,767 B1 | * | 9/2003 | Wellner et al. ........ | 379/202.01 |
| 2002/0191550 A1 | * | 12/2002 | Wilson ....................... | 370/260 |

* cited by examiner

Primary Examiner—S. Foster
(74) Attorney, Agent, or Firm—Baker Botts L.L.P.

(57) ABSTRACT

A conferencing system includes a number of devices that can participate in an audio conference using a conference bridge. Responding to a human or automated conference administrator, the bridge determines that audio content of media from a particular device is undesirable, and disables media from the particular device. If appropriate, the device receives prompts to rejoin the conference at a later time.

52 Claims, 4 Drawing Sheets

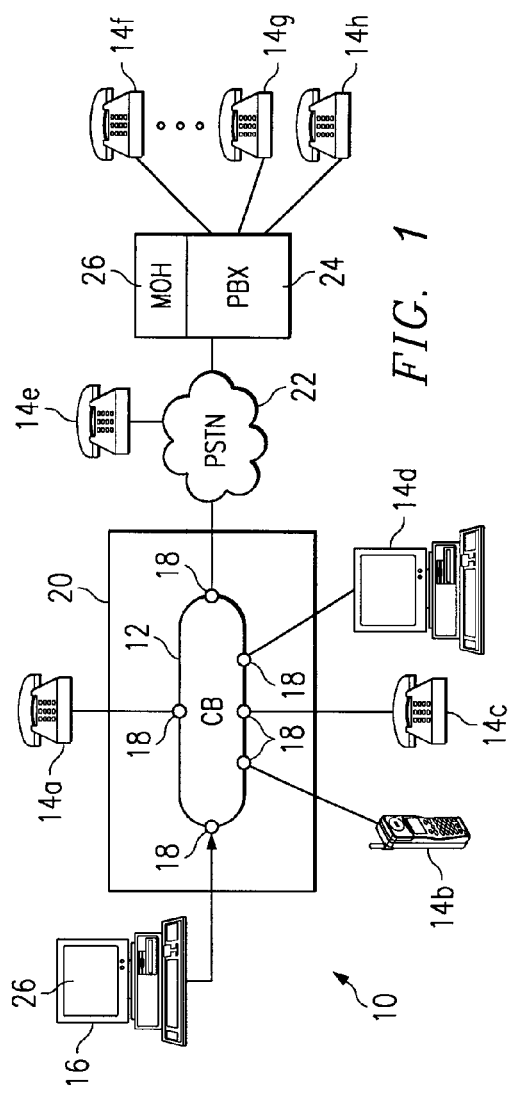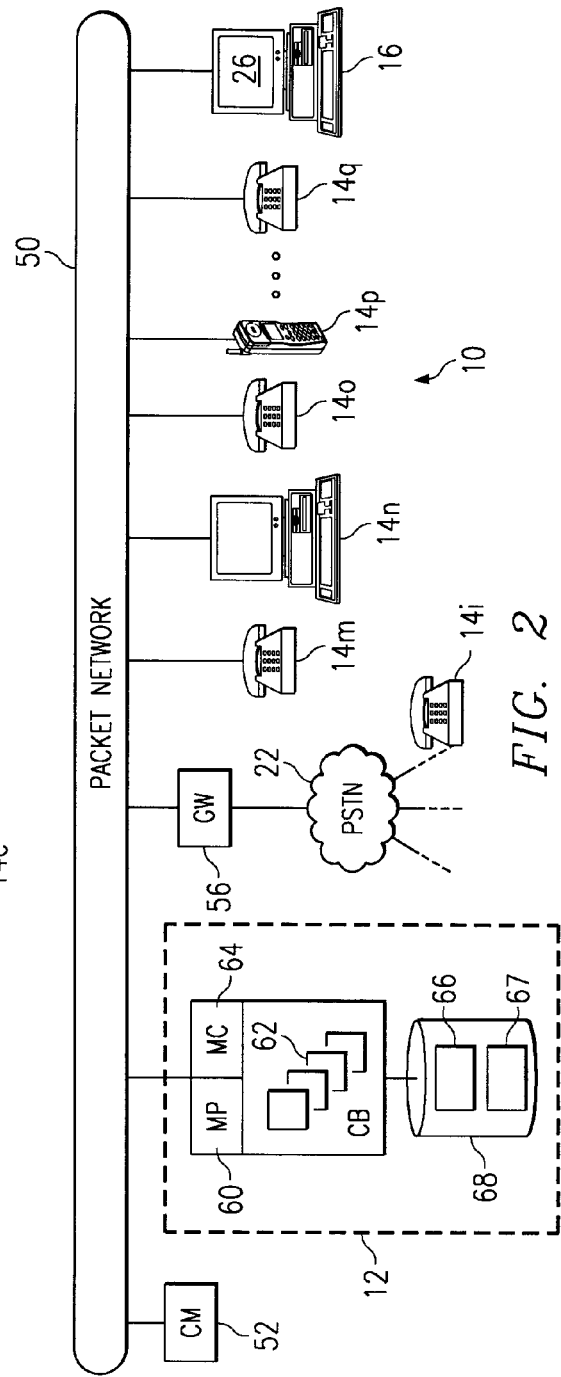
FIG. 1
FIG. 2

| CONFERENCE | ADDRESSES | PORTS | POWER | DISABLE ||
|---|---|---|---|---|---|
| | | | | ANNOUNCE | NO ANNOUNCE |
| 1 | | | | | |
| | A | 12 | 5 | ☐ | ☐ |
| | joe@cisco | 9 | 4 | ☐ | ☐ |
| | 56.0.0.112 | VPI/VCI | 0 | ☐ | ☐ |
| | 214-953-6500 | 3 | 8 | ☐ | ☐ |
| 2 | john@cisco | 2 | 3 | ☐ | ☐ |
| | x5102 | 72.1.1.39 | 6 | ☐ | ☐ |
| | x5108 | 7 | 5 | ☐ | ☐ |
| | C | 1 | 1 | ☐ | ☐ |
| | 128 | 193 | 0 | ☐ | ☐ |
| | 408-555-1000 | 11 | 9 | ☐ | ☐ |
| ⋮ | ⋮ | ⋮ | ⋮ | ⋮ | ⋮ |

*FIG. 3*

| CONFERENCE | ADDRESSES | PORTS | POWER | DISABLE ||
|---|---|---|---|---|---|
| | | | | ANNOUNCE | NO ANNOUNCE |
| 1 | | | | | |
| | A | 12 | 5 | ☐ | ☐ |
| | joe@cisco | 9 | 4 | ☐ | ☐ |
| | 56.0.0.112 | VPI/VCI | 0 | ☐ | ☐ |
| | 214-953-6500 | 3 | 8 | ☑ | ☐ |
| 2 | john@cisco | 2 | 3 | ☐ | ☐ |
| | x5102 | 72.1.1.39 | 6 | ☐ | ☐ |
| | x5108 | 7 | 5 | ☐ | ☑ |
| | C | 1 | 1 | ☐ | ☐ |
| | 128 | 193 | 0 | ☐ | ☐ |
| | 408-555-1000 | 11 | 9 | ☑ | ☐ |
| ⋮ | ⋮ | ⋮ | ⋮ | ⋮ | ⋮ |

*FIG. 4*

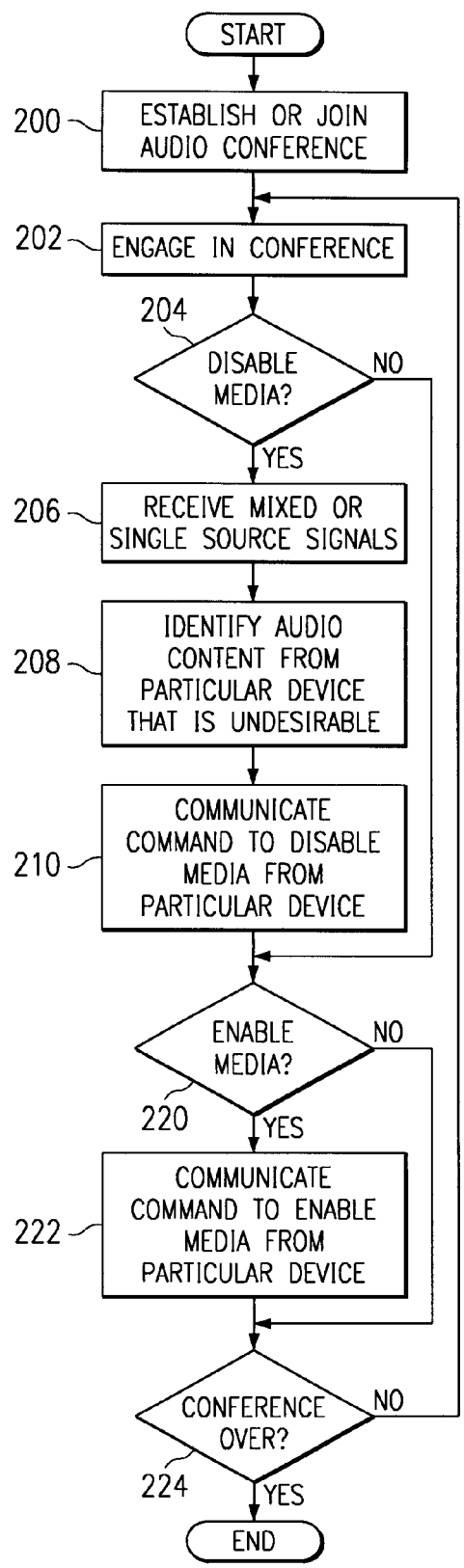

APPARATUS AND METHOD FOR CONTROLLING AN AUDIO CONFERENCE

TECHNICAL FIELD OF THE INVENTION

This invention relates generally to audio conferencing, and more particularly to an apparatus and method for controlling an audio conference.

BACKGROUND OF THE INVENTION

Consumers in businesses continue to demand more sophisticated communication systems that allow collaboration of voice, audio, and data. This demand fuels the development and deployment of new technologies that provide increased bandwidth and connectivity to end users. A conference call may now involve participants connecting using a variety of devices and technologies, and may also include other automated systems such as interactive voice response units, automated attendants, and other similar technologies. Communication providers face a challenge to integrate these different systems and provide reliable and effective control of participants and content in a conference.

SUMMARY OF THE INVENTION

The present invention solves many of the problems and disadvantages associated with prior conference technologies. In a particular embodiment, the present invention provides a method and apparatus for controlling an audio conference that disables media from a particular device that is determined to be undesirable.

In a particular embodiment, a method for controlling an audio conference includes establishing an audio conference between a number of devices, determining that audio content of media from a particular device is undesirable, and disabling the media from the particular device to terminate communication of the media from the particular device to the other devices in the audio conference.

In another embodiment, a conference bridge includes a number of ports to communicate media with a number of devices in an audio conference. The bridge also includes a media controller that determines that audio content of media from a particular device is undesirable. The media controller can disable media from the particular device to terminate communication of the media from the particular device to the other devices in the audio conference.

In still another embodiment of the present invention, a method for participating in an audio conference includes communicating media to a remote location and receiving mixed signals from the remote location, the mixed signals including media from a number of devices in an audio conference. The method also includes terminating participation in the audio conference, receiving a recorded prompt to rejoin the audio conference, and communicating a command to the remote location to rejoin the audio conference.

In still another embodiment of the present invention, a method for remotely managing an audio conference through control of a conference bridge includes participating in an audio conference established by a conference bridge, and monitoring media from a number of devices in the audio conference to identify audio content from a particular device that is undesirable. The method also includes communicating a command to the conference bridge to disable media from the particular device to terminate communication of the media from the particular device to the other devices in the audio conference.

Technical advantages of the present invention include the ability to control an audio conference by determining that audio content of media from a particular device is undesirable and then disabling the media from the particular device to improve the quality and efficiency of the conference. In particular embodiments, the undesirable media may originate from a particular device that places its call on hold. A human or automated conference administrator may then monitor selectively mixed signals or single source signals to identify the undesirable media, and generate appropriate commands to disable communication of the media to other devices in the audio conference. Media monitoring may consider the media having the highest average power measurement and may automatically determine an undesirable audio in a conference by identifying power characteristics of media. In addition, the device associated with the disabled media may receive a recorded prompt to rejoin the audio conference.

Other technical advantages include a conference bridge having a number of ports to communicate media with devices in an audio conference, and a media controller that can disable media from a particular device that is determined to be undesirable. The bridge may also include a media processor that receives, mixes, and communicates mixed signals to the devices. In a particular embodiment, the conference bridge, gateways, and devices may be coupled directly or indirectly using a packet network, such as an Internet Protocol ("IP") network. The conference administrator may couple to the network using any suitable device, such as a phone, computer, or other data and/or communication device. Using a suitable device, the conference administrator monitors and remotely manages the conference by selectively disabling media from one or more participating devices. Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, in which:

FIG. 1 illustrates one embodiment of a conferencing system incorporating teachings of the present invention;

FIG. 2 illustrates another embodiment of the system using a packet network;

FIG. 3 illustrates information maintained by the system to manage a conference;

FIG. 4 illustrates information in FIG. 3 with selected conference devices having disabled media;

FIG. 6 is a flow chart of a method for remotely managing an audio conference.

DETAILED DESCRIPTION OF THE INVENTION

Figure 5:
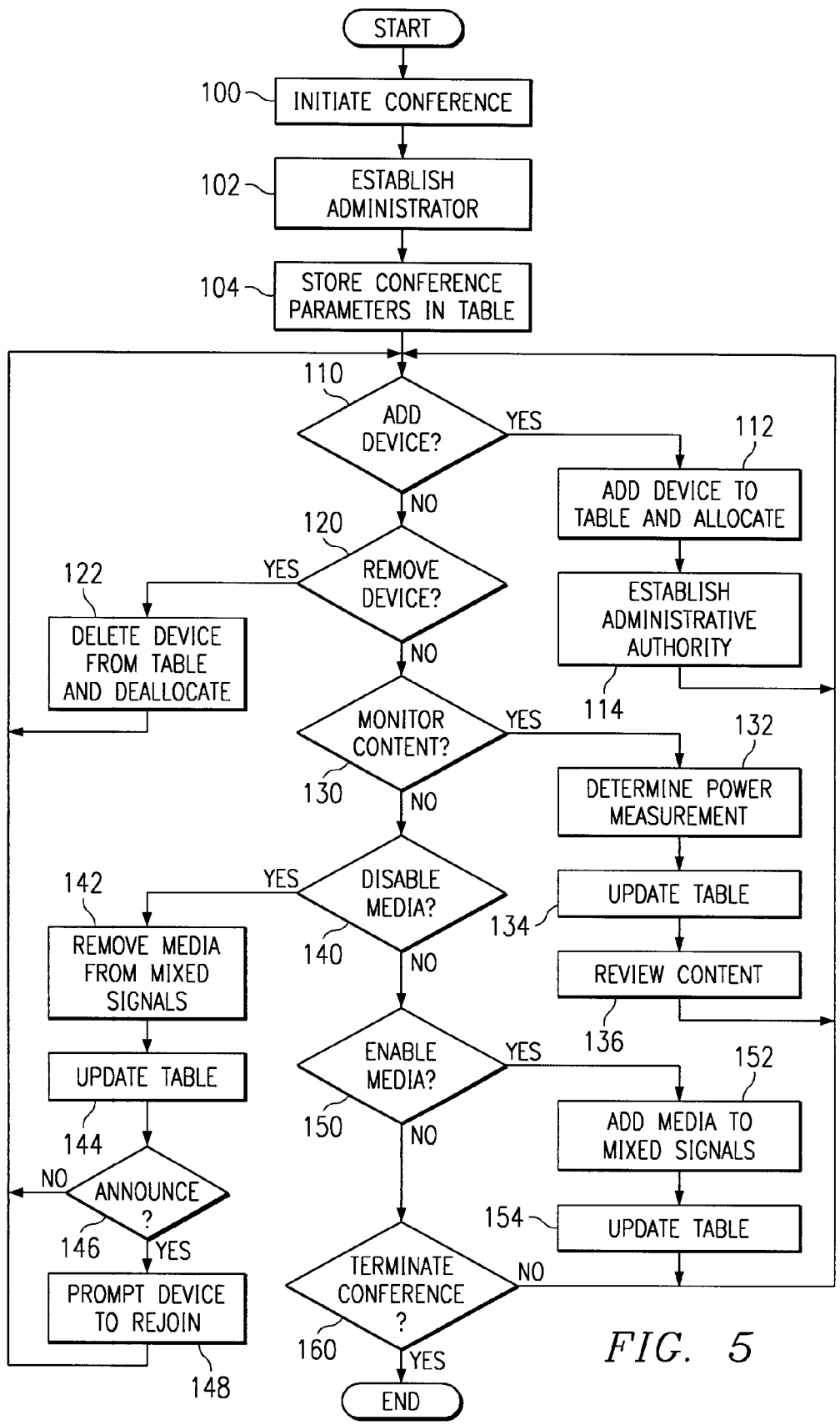
FIG. 5 is a flow chart of a method for controlling an audio conference.

FIG. 1 illustrates a conferencing system 10 that includes a conference bridge 12 and a number of devices 14 that can participate in an audio conference using conference bridge 12. A conference administrator operating, for example, device 14a, control terminal 16, or other appropriate device can monitor and selectively disable undesirable media from a particular device 14.

Conference bridge 12 may be an integral or distributed collection of hardware and/or software that communicates media with devices 14. Bridge 12 accomplishes this communication using physical ports, virtual ports, or other suitable direct or indirect connections (referred to generally as ports 18). One or more ports 18 may be used to manage the overall control and operation of bridge 12. Generally, bridge 12 receives media from devices 14, mixes or processes the media to generate mixed signals, and then communicates mixed signals to the devices 14 to establish an audio conference. Bridge 12 may be located in a network facility 20 that could also include a call manager, gateways, or other hardware and/or software to establish, maintain, and control audio conferences and media or signaling connectivity among a variety of devices 14. Also, the functionality of bridge 12 may be distributed among one or more devices 14 participating in an audio conference.

There are a number of devices 14 that can participate in an audio conference in system 10. Devices 14a–14d are shown coupled directly to ports 18 on bridge 12. Devices 14 may, for example, include cordless or cellular telephones, personal digital assistants ("PDAs"), or other wireless devices (shown generally as 14b). Also, devices 14 may include telephony software running on a computing device, as shown generally by device 14d. Similarly, devices may be traditional plain old telephone ("POTS") devices, analog phones, digital phones, Internet Protocol ("IP") telephony devices, or other computing and/or communication devices that communicate audio content using analog and/or digital signals.

Other devices 14 in system 10 may be coupled to bridge 12 using intermediate components. For example, device 14e couples to bridge 12 using the public switched telephone network ("PSTN") 22. Devices 14f–14h couple to bridge 12 using PSTN 22 and a private branch exchange, automated call distributor, or other similar device (referred to generally as PBX 24). In a particular embodiment, PBX 24 may include a music-on-hold ("MOH") capability or other functionality (shown generally as MOH 26) that plays audio when calls to devices 14f–14h are suspended, parked, or otherwise placed on hold. Audio may include a recorded audio segment, a radio broadcast, or any other audio content. One specific advantage of system 10 is the ability to disable media from devices 14f–14h that are placed on hold to terminate communication of undesirable audio to other conference devices. In one embodiment, bridge 12 and PBX 24 may engage in a signaling protocol that, using appropriate commands, directs PBX 24 to disable music-on-hold or other audio for any devices 14 participating in conferences managed by bridge 12.

Bridge 12 allows for a variety of devices 14 to engage in an audio conference. Also, using terminal 16, device 14a or other suitable device (referred to generally as a conference administrator device) a human or automated conference administrator may direct bridge 12 to disable undesirable media. In one embodiment, a conference administrator operating device 14a monitors an audio conference using inband commands, such as dual tone multifrequency ("DTMF") commands, voice commands, or other appropriate inband signaling. Alternatively or in addition, a conference administrator may use terminal 16 to establish a remote or local administrative link or other suitable out-of-band signaling to bridge 12 to monitor and selectively disable media in an audio conference. Terminal 16 includes a graphical user interface 26 that allows the conference administrator to establish, monitor, and/or selectively disable media for an audio conference. Terminal 16 couples to bridge 12 directly, using a dedicated dial-up connection, using a global computer network such as the Internet, or using any other suitable wireline or wireless communication techniques to both receive status information from bridge 12 and to communicate commands to bridge 12 to control the audio conference.

In operation, bridge 12 establishes an audio conference with a number of devices 14 by initiation of one of the conference devices, automated or manual establishment of the conference using terminal 16, or through some other suitable techniques. For the purposes of the discussion, assume bridge 12 establishes an audio conference between devices 14a, 14b, 14d, and 14f. System 10 contemplates any other arrangement or establishment of an audio conference among any selection of devices 14 using bridge 12. Bridge 12 receives media from participating devices 14 and, using suitable signal processing techniques, mixes the media to produce mixed signals. In one embodiment, each device receives a mixed signal that includes contribution from all other devices except itself. In this example, device 14a receives a mixed signal that includes contributions from devices 14b, 14d, and 14f. Similarly, device 14f receives a mixed signal including contributions from devices 14a, 14b, and 14d. During the audio conference, bridge 12 receives media from participating devices 14, mixes signals, and provides selectively mixed signals to the devices 14.

Now assume for the purposes of this audio conference, that device 14f places the conference call on hold. Placing a call on hold contemplates a hold, suspend, park, transfer or other similar activity that causes the communication of audio (e.g., recorded audio segments, broadcast music, advertising, announcements) or other undesirable media. In a particular embodiment, MOH 26 of PBX 24 communicates audio to bridge 12 when device 14f places a call on hold to establish communication with device 14e. All other conference participants hear the audio, which is undesirable. Music-on-hold or other recorded or live audio generated by PBX 24 is just one. example of undesirable media. Other examples may include media associated with a particularly offensive or dominating participant, media containing excessive static or low audio quality, or any other media from a particular device that is considered undesirable.

A human or automated conference administrator operating device 14a or terminal 16 hears or detects the offending media in the conference. To identify the source of the undesirable media, device 14a may receive in sequence a number of mixed media signals, each mixed signal excluding media from at least one other device 14 in the audio conference. In this manner, conference administrator selects the mixed signal in the sequence that effectively terminates communication of the undesirable media. In a particular case, the conference administrator at device 14a selects the mixed media that includes only the contributions of device 14b and 14d, effectively removing the audio generated as a result of device 14f being placed on hold. The conference administrator communicates a command via DTMF tones, voice commands, administrative link, or other suitable technique to bridge 12 to temporarily disable media associated with device 14f. The term disable contemplates any technique to prevent mixing of undesirable media for presentation to other conference participants. Bridge 12, device 14a, or other components in system 10 may still receive and potentially monitor disabled media associated with device, but the disabled media will not be mixed and shared with other conference participants. In a particular embodiment, bridge 12 communicates a recorded prompt to device 14f that invites device 14f to rejoin the audio conference, for example, after the call has been taken off hold.

In another embodiment, device 14a, instead of monitoring selectively mixed signals, may receive single source signals from each device in the audio conference. Upon reviewing media from devices 14b, 14d, and 14f, the conference administrator identifies the undesirable audio content as the single source signal from device 14f. Again, the conference administrator issues a command to bridge 12 using any suitable technique to disable media from device 14f.

In another embodiment, an automated conference administrator and/or bridge 12 automatically identifies power characteristics of media associated with device 14f as indicating a recorded audio segment, radio broadcast, or other undesirable media. In this case, bridge 12 autonomously disables media when it detects the presence of undesirable media in audio conferences. Alternatively, bridge 12 identifies potentially undesirable media and prompts a human conference administrator operating device 14a or terminal 16 to take appropriate action to disable media.

Bridge 12 may disable media associated with device 14f with a prompt to rejoin or with no prompt. Bridge 12 communicates a prompt to rejoin continuously on port 18 associated with device 14f so that when device 14f is taken off hold, the associated conference participant may respond to the prompt to rejoin by issuing a DTMF command, voice command, or other suitable command to rejoin the conference. Upon receiving this command, bridge 12 enables media from device 14f to rejoin the audio conference. If bridge 12 disables media associated with device 14f without a prompt, device 14f rejoins the conference upon the discretion of the conference administrator. System 10 contemplates any combination of prompting and no prompting to device 14 having disabled media to provide any level of conference administrator or participant control of the audio conference.

Technical advantages of system 10 include the ability to control an audio conference by determining that audio content of media from a particular device is undesirable and then disabling the media from the particular device to improve the quality and efficiency of the conference. In particular embodiments, the undesirable media may originate from a particular device that places its call on hold. A human or automated conference administrator may then monitor selectively mixed signals or single source signals to identify the undesirable media, and generate appropriate commands to disable communication of the media to other devices in the audio conference. Media monitoring may consider only god the media having the highest average power measurement and may automatically identify potentially undesirable audio in a conference by determining power characteristics of media. In addition, the device associated with the disabled media may receive a recorded prompt to rejoin the audio conference.

FIG. 2 illustrates a particular embodiment of system 10 that includes components communicating using packet network 50. In this particular embodiment, system 10 includes a call manager ("CM") 52 that manages the overall establishment of calls in system 10. Conference bridge 12 provides overall control and media mixing for audio conferences as described with reference to FIG. 1. A gateway ("GW") 56 allows devices 14 coupled to PSTN 22 or other circuit-switched networks to participate in audio conferences using packet network 50. System 10 also includes a variety of devices 14 (similar to FIG. 1) and terminal 16 that may be used by a conference administrator to control an audio conference.

Bridge 12 includes a number of components to establish conferences, mix media, and provide overall control and management of audio conferences. A media processor ("MP") 60 operating with digital signal processing (DSP) resources 62 performs encoding, transcoding, compressing, decompressing, decoding, mixing, and other signal processing functions to establish and control an audio conference. For example, DSP resources 62 may perform adaptive speech recognition (ASR) or other suitable techniques to support voice commands. Media controller ("MC") 64 provides the overall control and management of multiple audio conferences conducted using bridge 12. Specifically, MC 64 may provide administrative control, port assignment, admission control, media resource allocation, command generation and receipt, undesirable media analysis, power level determination, and any other activities to control the conference and direct MP 60 to provide the appropriate signal processing. Specifically, MC 64 may command MP 60 to generate particular mixed signals or single source signals for communication to a port associated with a conference administrator for effective monitoring of the audio conference. In addition, MC 64 receives inband or administrative link signals from the human or automated conference administrator to disable or enable media mixing from particular devices. To establish and manage multiple audio conferences, MC 64 maintains a conference table 66 and voice prompts 67 in memory 68. Memory 68 may be any suitable form of a volatile or non-volatile memory that is integral or separate from bridge 12. Bridge 12 contemplates any suitable arrangement and coordination of functions between MP 60, DSP resources 62, and MC 64.

In operation, devices 14m–14q and other devices coupled to packet network 50 using GW 56, such as device 14i, can establish an audio conference using bridge 12. In this particular packet-based environment, bridge 12 establishes an audio conference using any number of virtual port or connection assignments, such as Internet Protocol ("IP") addresses, virtual channel or virtual path identifiers ("VCI/VPI"), session initiation protocol ("SIP") addresses, IP telephony addresses and extensions, PSTN telephone numbers, or any other suitable addresses. Using these addresses, bridge 12 receives media from devices 14, encodes, decodes, and/or transcodes the media into a proper format using MP 60 and DSP resources 62, and generates a number of mixed signals for communication back to devices 14. Both the media received by bridge 12 and the mixed signals communicated by bridge 12 are in the form of audio content encoded in packets, cells, or other portions or segments of information suitable for communication over packet network 50 (referred to generally as packets). Devices 14 receive this packetized audio content for presentation to conference participants. If a device 14 couples to PSTN 22 or other circuit-switched network, GW 56 provides appropriate translation between packet-based information communicated by packet network 50 and circuit-switched information communicated by PSTN 22.

A conference administrator receives selectively mixed signals or single source signals from bridge 12 to identify audio content of media from a particular device 14 that is undesirable. Using commands from device 14 or commands from terminal 16, a human conference administrator may selectively disable media from particular devices. Alternatively, bridge 12 may autonomously identify undesirable media and disable the media or prompt an administrator to disable the media.

FIG. 3 illustrates table 66 maintained by bridge 12 to establish and manage an audio conference. Table 66 includes a number of entries, each entry specifying a conference identifier 70 and addresses 72 of devices 14 participating in the conference. Each entry also specifies a port 74, suitable power measurement 76, and disable status 78 for each device 14 in the conference. Addresses 72 may include IP address, SIP address, telephone extensions, or any other suitable identifier or address that allows bridge 12 to designate different devices 14 participating in an audio conference. In a particular embodiment, one or more addresses 72 may be shaded to indicate a device acting as a conference administrator with authority to disable and enable media from other devices. Ports 74 designate any physical or virtual port or connection associated with devices 14 in the audio conference. Power measurement 76 indicates any suitable power measurement that allows bridge 12 to determine the dominant devices 14 in an audio conference and, in a particular embodiment, to identify power characteristics of media associated with a particular device 14 as indicating a recorded audio segment or radio broadcast. For example, bridge 12 may generate entries for power measurement 76 using averages over time, filters, or other suitable content analysis techniques that allow bridge 12 to determine trends in audio content. Disable status 78 includes both an announce and no announce option. In the announce option, bridge 12 communicates a recorded prompt to a particular device with disabled media inviting the device to rejoin the audio conference. Disable status 78 with no announce indicates that disabled media will not be enabled without intervention from the conference administrator.

Table 66 contains any number of entries, each entry specifying a current conference maintained by bridge 12. For example, entry 80 specifies conference #1 that includes four devices, with the device having an address "A" serving as conference administrator. Each device has an associated port 74 and power measurement 76, and currently no devices in conference #1 have disabled media. Similarly, entry 82 specifies conference #2 that includes six devices, with devices having addresses "john@cisco" and "128" having authority to act as conference administrators to disable media. Again, each device has an associated port 74 and power measurement 76, and no devices currently have disabled media.

FIG. 4 now illustrates table 66 showing selected devices having disabled media. Specifically, in conference #1, media associated with the device identified by address "214-953-6500" has been disabled with the announce option. Therefore, the device associated with this address will receive a prompt to rejoin the conference. In conference #2, bridge 12 disabled media from two devices. Specifically, media associated with the device having an address of "408-555-1000" has been disabled with the announce option, while media associated with the device having an address of "x5108" has been disabled with the no announce option. In the latter case, the device cannot rejoin the conference without intervention from one of the two conference administrators or bridge 12. Although FIGS. 3 and 4 illustrate information maintained by bridge 12 in a table format, system 10 contemplates any storage of information at one or more locations in any suitable format to facilitate establishment and management of audio conferences in system 10.

FIG. 5 is a flow chart of a method to control an audio conference that begins when bridge 12 initiates a conference at step 100. This may be done in response to a participant issuing commands at an associated device 14, through administrator control using an associated device 14 and/or terminal 16, through a meet-me conferencing operation, or other suitable technique. Before, during, or after initiating the conference at step 100, bridge 12 may establish one or more conference administrators at step 102. Each conference administrator associated with an established conference receives suitable levels of authority to add and remove devices, monitor content, disable and enable media associated with devices, or terminate the conference. Bridge 12 stores conference parameters as an entry in table 66 at step 104.

Upon establishing an audio conference, bridge 12 performs any variety of functions either autonomously or in response to commands received inband or through an administrative link from a conference administrator. These functions may include adding a device (step 110), removing a device (step 120), monitoring content (step 130), disabling media associated with a device (step 140), enabling a device (step 150), and terminating the conference (step 160). Bridge 12 also performs the media processing, which may include encoding, decoding, transcoding, mixing, filtering, and other signal processing functions to allow the receipt of media from multiple devices 14, the mixing of this media in an appropriate manner, and delivery of mixed signals to devices 14 to establish an audio conference.

If device 14 is to be added at step 110, bridge 12 assigns a port 18, allocates appropriate DSP resources 62, adds the device 14 to table 66 at step 112 and, if appropriate, establishes administrative authority for device 14 at step 114. In a particular situation where device 14 couples to bridge 12 using PBX 24, signals may be communicated between bridge 12 and PBX 24 to disable music-on-hold or other communication of undesirable audio by PBX 24. Similarly, if device 14 is to be removed from a conference at step 120, bridge 12 deletes the device from table 66 at step 122 and deallocates its port 18 and associated DSP resources 62.

To review content at step 130, bridge 12 determines power measurement 76 at step 132, and updates table 66 at step 134. Bridge 12 may implement a number of content review techniques at step 136. In one embodiment, bridge 12 autonomously reviews content based on a suitable power characteristic to identify any recorded audio segments, radio broadcast, or other undesirable content. Alternatively, bridge 12 may allow a human conference administrator to monitor content. This may be done by communicating to device 14 and/or terminal 16 associated with conference administrator mixed signals that selectively exclude particular devices, single source signals, or other signals that allow conference administrator to identify the undesirable audio content. In a particular embodiment, bridge 12 does not communicate all variations of mixed signals or single signal sources, but communicates those signals associated with devices 14 having the highest power measurements.

Bridge 12 may disable media associated with device 14 in an audio conference at step 140. Bridge 12 removes the audio content from mixed signals that are communicated to other devices 14 at step 142, and updates disable status 78 in table 66 at step 144. For disabled media with an announce option as determined at step 146, bridge 12 communicates a recorded prompt to rejoin on port 18 associated with device 14 at step 148.

Bridge 12 enables previously disabled media associated with devices 14 at step 150 using a number of techniques. For example, device 14 may rejoin the conference based on a response to the recorded prompt played at step 148. This response may be a DTMF tone, a voice command, or other appropriate indication that device 14 wants to rejoin the conference. Also bridge 12 may enable device 14 in response to receiving a command from the conference administrator operating device 14 and/or terminal 16. Bridge 12 may also enable device 14 autonomously based on a change in received audio content due to termination of a recorded message such as music-on-hold, termination of excessive static on the line, detection of a human voice, or other triggering activity autonomously detected by bridge 12. In response to any of these commands or autonomous events, bridge 12 adds audio content of the enabled device 14 to mixed signals communicated to other devices 14 in the conference at step 152. Bridge 12 updates disable status 78 in table 66 at step 154.

If bridge 12 determines autonomously or receives direction from one or more devices 14 to terminate the conference at step 160, then the method ends. Otherwise, the method continues to execute the functions illustrated in steps 110–160. Although shown as executing these functions in sequence, it should be understood that system 10 allows functions to be executed by bridge 12, device 14, or other components of system 10 simultaneously, in sequence, or in any other ordered arrangement. Also, the method performed in FIG. 5 may be initiated as an instantiated process for each conference handled by bridge 12, and executed simultaneously in a distributed processing environment.

FIG. 6 is a flow chart of method for remotely controlling an audio conference. This method may be executed by one or more devices 14 or terminals 16 operated by conference administrators or participants. In a particular embodiment, control of the audio conference is performed remotely through the issuance of commands that are either inband (e.g., DTMF tones, voice commands) or based on commands received from terminal 16 using a suitable wireline or wireless administrative link. The method begins at step 200 when a participant with sufficient class of service or authority establishes or joins an audio conference. A participant with sufficient authority to monitor and control an audio conference will be referred to generally as a conference administrator. Using associated device 14 or terminal 16, conference administrator engages in an audio conference at step 202 by communicating media and receiving mixed signals associated with other devices in the audio conference.

The conference administrator may selectively disable media associated with devices 14 as determined at step 204 using a variety of techniques. The conference administrator receives mixed or single source signals at step 206. These signals may be received in serial, upon conference participant selection, or using any other sequence or arrangement that allows the conference administrator to determine undesirable audio content in a conference. If receiving mixed signals, bridge 12 provides device 14 operated by the conference administrator with a number of selectively mixed signals, each selectively mixed signal excluding audio content from one of the devices 14. The conference administrator reviews these selectively mixed signals to determine which signal properly excludes the undesirable audio content. Alternatively, bridge 12 may provide device 14 of the conference administrator with single source signals, allowing the conference administrator to specifically identify the undesirable single source signal.

Using any of the monitoring techniques discussed at step 206, the conference administrator identifies audio content from a particular device 14 that is undesirable at step 208. Based on this identification, device 14 or terminal 16 communicates a command to bridge 12 to disable the media from the particular device 14 at step 210. During steps 206–210, the conference administrator may interact with GUI 26 on terminal 16 to select audio content to review, the manner and sequence in which it is reviewed, and to initiate communication of a command to bridge 12 to disable media. GUI 26 contemplates any form of interactive or passive graphical presentation about information associated with the audio conference. Alternatively, steps 206–210 may be performed by the conference administrator using appropriate DTMF commands, voice commands, or other suitable technique.

The conference administrator may periodically review those devices 14 associated with disabled media and determine at step 220 whether any devices 14 should rejoin the audio conference. Device 14 or terminal 16 associated with the conference administrator communicates a command to enable media from the particular device 14 at step 222. If the audio conference is over at step 224 then the method ends, otherwise the method continues at step 202.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for controlling an audio conference, comprising:

establishing an audio conference between a plurality of devices coupled to a packet network;

determining that audio content of media from a particular device is undesirable; and disabling the media from the particular device to terminate communication of the media from the particular device to the other devices in the audio conference;

wherein the media is communicated in packets.

2. The method of claim 1, wherein the media from the particular device comprises audio generated as a result of the particular device placing on hold a call associated with the audio conference.

3. The method of claim 1, wherein the particular device comprises a private branch exchange servicing a phone used by a conference participant, the private branch exchange operable to communicate audio when the conference participant places on hold a call associated with the audio conference.

4. The method of claim 1, wherein the audio conference comprises a meet-me conference and further comprising mixing media from the devices using a conference bridge.

5. The method of claim 1, wherein establishing an audio conference comprises:

receiving media from the devices;

mixing media from the devices to generate a plurality of mixed signals;

communicating mixed signals to the devices.

6. The method of claim 1, wherein determining comprises:

communicating a plurality of selectively mixed signals to a conference administrator device for monitoring, each selectively mixed signal excluding media from at least one of the devices; and receiving a command from the conference administrator device to disable media from the particular device.

7. The method of claim 6, wherein the command comprises an inband dual tone multifrequency signal, a spoken command, or an out-of-band signal from an administrative link.

8. The method of claim 6, wherein the selectively mixed signals exclude media from devices having the highest average power measurement.

9. The method of claim 1, wherein determining comprises:

communicating a plurality of single source signals to a conference administrator device for monitoring, each single source signal generated by one of the devices; and receiving a command from the conference administrator device to disable media from the particular device.

10. The method of claim 9, wherein the single source signals comprise media from devices having the highest average power measurement.

11. The method of claim 1, wherein determining comprises identifying power characteristics of media associated with the particular device as indicating a recorded audio segment or broadcast radio.

12. The method of claim 1, further comprising:

communicating a recorded prompt to the particular device, the recorded prompt inviting the particular device to rejoin the audio conference; and receiving a command to rejoin the audio conference from the particular device.

13. The method of claim 12, wherein the command comprises an inband dual tone multifrequency signal, a spoken command, or an out-of-band signal from an administrative link.

14. The method of claim 1, further comprising enabling media from the particular device to resume communication of media from the particular device to the other devices in the audio conference.

15. A conference bridge, comprising:
   a plurality of ports to communicate media with a plurality of devices in an audio conference; and
   a media controller operable to determine that audio content of media from a particular device is undesirable, the media controller further operable to disable media from the particular device to terminate communication of the media from the particular device to the other devices in the audio conference;
   wherein the plurality of devices are coupled to the conference bridge using a packet network and the media is communicated in packets.

16. The conference bridge of claim 15, further comprising a media processor operable to:
   receive media from the devices;
   mix media from the devices to generate a plurality of mixed signals; and
   communicate mixed signals to the devices.

17. The conference bridge of claim 15, further comprising a gateway coupled to a selected device in the audio conference using a circuit-switched network, the gateway operable to communicate media between the conference bridge and the circuit-switched network.

18. The conference bridge of claim 15, wherein:
   the ports comprise virtual ports; and
   the media comprises packets of audio information.

19. The conference bridge of claim 15, wherein the media from the particular device comprises audio generated as a result of the particular device placing on hold a call associated with the audio conference.

20. The conference bridge of claim 15, wherein the particular device comprises a private branch exchange servicing a phone used by a conference participant, the private branch exchange operable to communicate audio when the conference participant places on hold a call associated with the audio conference.

21. The conference bridge of claim 15, wherein:
   the conference bridge communicates a recorded prompt to the particular device, the recorded prompt inviting the particular device to rejoin the audio conference; and
   the media controller receives a command to rejoin the audio conference from the particular device.

22. The conference bridge of claim 15, further comprising a memory operable to store a plurality of conference entries, each conference entry identifying the devices in the audio conference, a power measurement for each device, and a disable status of each device indicating whether media from the device is disabled.

23. The conference bridge of claim 15, further comprising enabling media from the particular device to resume communication of media from the particular device to the other devices in the audio conference.

24. Conference control software embodied in computer readable media and operable to:
   establish an audio conference between a plurality of devices coupled to a packet network;
   determine that audio content of media from a particular device is undesirable; and
   disable the media from the particular device to terminate communication of the media from the particular device to the other devices in the audio conference;
   wherein the media is communicated in packets.

25. The conference control software of claim 24, wherein the media from the particular device comprises audio generated as a result of the particular device placing on hold a call associated with the audio conference.

26. The conference control software of claim 24, wherein the particular device comprises a private branch exchange servicing a phone used by a conference participant, the private branch exchange operable to communicate audio when the conference participant places on hold a call associated with the audio conference.

27. The conference control software of claim 24, wherein the audio conference comprises a meet-me conference and further comprising mixing media from the devices using a conference bridge.

28. The conference control software of claim 24, wherein establishing an audio conference comprises:
   receiving media from the devices;
   mixing media from the devices to generate a plurality of mixed signals;
   communicating mixed signals to the devices.

29. The conference control software of claim 24, wherein determining comprises:
   communicating a plurality of selectively mixed signals to a conference administrator device for monitoring, each selectively mixed signal excluding media from at least one of the devices; and
   receiving a command from the conference administrator device to disable media from the particular device.

30. The conference control software of claim 29, wherein the command comprises an inband dual tone multifrequency signal, a spoken command, or an out-of-band signal from an administrative link.

31. The conference control software of claim 29, wherein the selectively mixed signals exclude media from devices having the highest average power measurement.

32. The conference control software of claim 24, wherein determining comprises:
   communicating a plurality of single source signals to a conference administrator device for monitoring, each single source signal generated by one of the devices; and
   receiving a command from the conference administrator device to disable media from the particular device.

33. The conference control software of claim 32, wherein the single source signals comprise media from devices having the highest average power measurement.

34. The conference control software of claim 24, wherein determining comprises identifying power characteristics of media associated with the particular device as indicating a recorded audio segment or broadcast radio.

35. The conference control software of claim 24, further comprising:
   communicating a recorded prompt to the particular device, the recorded prompt inviting the particular device to rejoin the audio conference; and
   receiving a command to rejoin the audio conference from the particular device.

36. The conference control software of claim 24, further comprising enabling media from the particular device to resume communication of media from the particular device to the other devices in the audio conference.

37. A conference bridge, comprising:
   means for establishing an audio conference between a plurality of devices coupled to a packet network;
   means for determining that audio content of media from a particular device is undesirable; and
   means for disabling the media from the particular device to terminate communication of the media from the particular device to the other devices in the audio conference;
   wherein the media is communicated in packets.

38. The conference bridge of claim 37, wherein the particular device comprises a private branch exchange servicing a phone used by a conference participant, the private branch exchange operable to communicate audio when the conference participant places on hold a call associated with the audio conference.

39. The conference bridge of claim 37, wherein the means for establishing an audio conference comprises:

means for receiving media from the devices;

means for mixing media from the devices to generate a plurality of mixed signals;

means for communicating mixed signals to the devices.

40. The conference bridge of claim 37, wherein means for determining comprises:

means for communicating a plurality of selectively mixed signals to a conference administrator device for monitoring, each selectively mixed signal excluding media from at least one of the devices; and means for receiving a command from the conference administrator device to disable media from the particular device.

41. The conference bridge of claim 37, further comprising:

communicating a recorded prompt to the particular device, the recorded prompt inviting the particular device to rejoin the audio conference; and receiving a command to rejoin the audio conference from the particular device.

42. A method for participating in an audio conference, comprising:

communicating media to a remote location using a packet network;

receiving mixed signals from the remote location, the mixed signals comprising media from a plurality of devices in an audio conference;

terminating participation in the audio conference;

receiving a recorded prompt to rejoin the audio conference; and communicating a command to the remote location to rejoin the audio conference;

wherein the media is communicated in packets.

43. The method of claim 42, wherein terminating participation comprises:

placing on hold a call associated with the audio conference; and communicating audio to the remote location.

44. The method of claim 42, wherein the step of communicating audio is performed by a private branch exchange servicing a phone used by a conference participant.

45. The method of claim 42, wherein the audio conference comprises a meet-me conference.

46. A method for remotely managing an audio conference through control of a conference bridge, comprising:

participating in an audio conference established by a conference bridge coupled to a packet network;

monitoring media from a plurality of devices in the audio conference to identify audio content from a particular device that is undesirable; and communicating a command to the conference bridge to terminate communication of the media from the particular device to the other devices in the audio conference;

wherein the media is communicated in packets.

47. The method of claim 46, wherein the command comprises an inband dual tone multifrequency signal, a spoken command, or an out-of-band signal communicated using an administrative link.

48. The method of claim 46, wherein the particular device comprises a private branch exchange servicing a phone used by a conference participant, the private branch exchange operable to communicate audio when the conference participant places on hold a call associated with the audio conference.

49. The method of claim 46, wherein monitoring comprises:

receiving a plurality of selectively mixed signals, each mixed signal excluding media from at least one of the devices;

outputting the selectively mixed signals to a conference administrator; and receiving a selection of a desired mixed signal from the conference administrator, the desired mixed signal excluding media from the particular device.

50. The method of claim 49, wherein the selectively mixed signals exclude media from devices having the highest average power measurement.

51. The method of claim 46, wherein monitoring comprises:

receiving a plurality of single source signals, each single source signal generated by one of the devices;

outputting the single source signals to a conference administrator; and receiving a selection of an offending single source signal from the conference administrator, the offending single source signal comprises media from the particular device.

52. The method of claim 51, wherein the single source signals comprise media from devices having the highest average power measurement.

\* \* \* \* \*

UNITED STATES PATENT AND TRADEMARK OFFICE
CERTIFICATE OF CORRECTION

| | |
|---|---|
| PATENT NO. | : 6,839,416 B1 |
| APPLICATION NO. | : 09/643315 |
| DATED | : January 4, 2005 |
| INVENTOR(S) | : Shmuel Shaffer |

It is certified that error appears in the above-identified patent and that said Letters Patent is hereby corrected as shown below:

Title Page item 74, Right Column, Primary Examiner, delete "S. Foster" and insert -- Roland G. Foster --.

Title Page, Right Column, References Cited item (56), Line 8, delete "6,490,556 B1" and insert -- 6,490,556 B2 --.

Column 9, Line 62, Claim 1, delete Claim 1 in its entirety and insert the following:
--     1. A method for controlling an audio conference, comprising:
        establishing an audio conference between a plurality of devices coupled to a packet network;
        communicating a plurality of selectively mixed signals to a conference administrator device for monitoring, each selectively mixed signal including media from at least two of the devices and excluding media from at least one of the devices;
        receiving a command from the conference administrator device to disable media from a particular device; and
        disabling the media from the particular device to terminate communication of the media from the particular device to the other devices in the audio conference; wherein the media is communicated in packets. --

Column 10, Line 24, Claim 6 is Canceled.
Column 10, Line 32, Claim 7, after "claim", delete "6" and insert -- 1 --.
Column 10, Line 36, Claim 8, after "claim", delete "6" and insert -- 1 --.
Column 10, Lines 39-40, Claim 9, after "claim 1,", delete "wherein determining comprises:" and insert -- further comprising --.
Column 10, Line 41, Claim 9, after "to", delete "a conference" and insert -- the conference --.
Column 10, Line 45, Claim 9, after "receiving a" insert -- second --.
Column 10, Lines 50-51, Claim 11, after "claim 1,", delete "wherein determining comprises" and insert -- further comprising --.
Column 10, Line 58, Claim 12, after "receiving a", delete "command" and insert -- request --.
Column 10, Line 60, Claim 13, after "wherein the", delete "command" and insert -- request --.
Column 11, Line 1, Claim 15, delete Claim 15 in its entirety and insert the following:
--     15. A conference bridge, comprising:
        a plurality of ports to communicate media with a plurality of devices in an audio conference;
        a media processor operable to receive media from the devices and to selectively mix signals for communication to a conference administrator device for monitoring, each selectively mixed signal including media from at least two of the devices and excluding media from at least one of the devices; and

UNITED STATES PATENT AND TRADEMARK OFFICE
CERTIFICATE OF CORRECTION

| | | |
|---|---|---|
| PATENT NO. | : 6,839,416 B1 | |
| APPLICATION NO. | : 09/643315 | |
| DATED | : January 4, 2005 | |
| INVENTOR(S) | : Shmuel Shaffer | |

It is certified that error appears in the above-identified patent and that said Letters Patent is hereby corrected as shown below:

Column 11, Line 1, Claim 15(cont'd):
 a media controller operable to disable media from a particular device to terminate communication of the media from the particular device to the other devices in the audio conference in response to a command received from the conference administrator device;
 wherein the plurality of devices are coupled to the conference bridge using a packet network and the media is communicated in packets. --
Column 11, Lines 14-15, Claim 16, after "claim 15,", delete "further comprising a media processor operable to:" and insert -- the media processor further operable to: --.
Column 11, Line 16, Claim 16, delete "receive media from the devices;"
Column 11, Line 42, Claim 21, after "receives a", insert -- second --.
Column 11, Line 54, Claim 24, delete Claim 24 in its entirety and insert the following:
-- 24. Conference control software embodied in computer readable media and operable to:
 establish an audio conference between a plurality of devices coupled to a packet network;
 communicate a plurality of selectively mixed signals to a conference administrator device for monitoring, each selectively mixed signal including media from at least two of the devices and excluding media from at least one of the devices;
 receive a command from the conference administrator device to disable media from a particular device; and
 disable the media from the particular device to terminate communication of the media from the particular device to the other devices in the audio conference; wherein the media is communicated in packets. --
Column 12, Line 17, Claim 29 is Canceled.
Column 12, Line 25, Claim 30, after "of", delete "claim 29" and insert -- claim 24 --.
Column 12, Line 29, Claim 31, after "of", delete "claim 29" and insert -- claim 24 --.
Column 12, Lines 32-39, delete Claim 32 in its entirety and insert the following:
-- 32. The conference control software of Claim 24, further operable to:
 communicate a plurality of single source signals to the conference administrator device for monitoring, each single source signal generated by one of the devices; and
 receive a second command from the conference administrator device to disable media from the particular device. --
Column 12, Lines 43-44, Claim 34, after "claim 24,", delete "wherein determining comprises identifying" and insert -- further operable to identify --.
Column 12, Lines 47-53, delete Claim 35 in its entirety and insert the following:
-- 35. The conference control software of Claim 24, further operable to:
 communicate a recorded prompt to the particular device, the recorded prompt inviting the particular device to rejoin the audio conference; and
 receive a request to rejoin the audio conference from the particular device. --

UNITED STATES PATENT AND TRADEMARK OFFICE
CERTIFICATE OF CORRECTION

| | |
|---|---|
| PATENT NO. | : 6,839,416 B1 |
| APPLICATION NO. | : 09/643315 |
| DATED | : January 4, 2005 |
| INVENTOR(S) | : Shmuel Shaffer |

It is certified that error appears in the above-identified patent and that said Letters Patent is hereby corrected as shown below:

Column 12, Line 55, Claim 36, delete "comprising enabling" and insert -- operable to enable --.
Column 12, Lines 58-67, delete Claim 37 in its entirety and insert the following:
-- 37. A conference bridge, comprising:
 means for establishing an audio conference between a plurality of devices coupled to a packet network;
 means for communicating a plurality of selectively mixed signals to a conference administrator device for monitoring, each selectively mixed signal including media from at least two of the devices and excluding media from at least one of the devices;
 means for receiving a command from the conference administrator device to disable media from a particular device; and
 means for disabling the media from the particular device to terminate communication of the media from the particular device to the other devices in the audio conference;
 wherein the media is communicated in packets. --
Column 13, Line 13, Claim 40 is Canceled.
Column 13, Line 27, Claim 41, after "receiving a", delete "command" and insert
-- request --.
Column 13, Line 30, Claim 42 is Canceled.
Column 13, Line 44, Claim 43 is Canceled.
Column 13, Line 49, Claim 44 is Canceled.
Column 13, Line 52, Claim 45 is Canceled.
Column 14, Lines 1-13, delete Claim 46 in its entirety and insert the following:
-- 46. A method for remotely managing an audio conference through control of a conference bridge, comprising:
 participating in an audio conference established by a conference bridge coupled to a packet network;
 receiving a plurality of selectively mixed signals, each mixed signal excluding media from at least one of the devices;
 outputting the selectively mixed signals to a conference administrator;
 receiving a selection of a desired mixed signal from the conference administrator, the desired mixed signal excluding media from a particular device;
 communicating a command to the conference bridge to terminate communication of the media from the particular device to the other devices in the audio conference;
 wherein the media is communicated in packets. --
Column 14, Line 24, Claim 49 is Canceled.
Column 14, Line 35, Claim 50, after "claim", delete "49" and insert -- 46 --.
Column 14, Lines 39-40, Claim 51, after "claim 46,", delete "wherein monitoring comprises:" and insert -- further comprising: --.

UNITED STATES PATENT AND TRADEMARK OFFICE
CERTIFICATE OF CORRECTION

PATENT NO. : 6,839,416 B1
APPLICATION NO. : 09/643315
DATED : January 4, 2005
INVENTOR(S) : Shmuel Shaffer It is certified that error appears in the above-identified patent and that said Letters Patent is hereby corrected as shown below:

Column 14, Line 43, Claim 51, after "signals to", delete "a" and insert -- the --.

Signed and Sealed this

Twenty-eighth Day of August, 2007

JON W. DUDAS
*Director of the United States Patent and Trademark Office*